United States Patent [19]

Fiorido

[11] Patent Number: 5,325,801
[45] Date of Patent: Jul. 5, 1994

[54] PRECISION-TYPE SINGLE-SEED PNEUMATIC PLANTER

[75] Inventor: Antonino F. Fiorido, Pordenone, Italy

[73] Assignee: Matermacc S.r.l., Pordenone, Italy

[21] Appl. No.: 957,089

[22] Filed: Oct. 6, 1992

[30] Foreign Application Priority Data

Oct. 7, 1991 [IT] Italy .................. PN91 A 000065

[51] Int. Cl.⁵ .......................... A01C 7/00; B65G 59/04
[52] U.S. Cl. .................................... 111/185; 221/211
[58] Field of Search .............. 111/130, 170, 174, 183, 111/184, 185, 177; 221/185, 211, 217, 221, 222, 203

[56] References Cited

U.S. PATENT DOCUMENTS

| | | | |
|---|---|---|---|
| 3,796,346 | 3/1974 | Ribouleau | 111/185 |
| 4,664,290 | 5/1987 | Martin et al. | 111/185 |
| 5,143,002 | 9/1992 | Gaspardo | 111/185 |

Primary Examiner—Clifford D. Crowder
Assistant Examiner—Larry D. Worrell, Jr.
Attorney, Agent, or Firm—Wenderoth, Lind & Ponack

[57] ABSTRACT

A precision-type single-seed planter has seed distributor in the form of a disk provided with elongate perforations of a narrow width, which cooperate with a seed container and an air suction device. Because the perforations in the disk have an elongate shape and a small cross section even large seeds can be held on the disk by suction at each of the perforations whereas smaller seeds will also be held without being able to pass through the perforations. A selector element cooperates with the disk by throttling the suction effected on the seeds through the perforations so that only individual ones of the seeds, particularly the smaller seeds, are adhered at each perforation. An optimum seed separation and single-seed distribution effect is thus achieved, regardless of the size and shape of the seeds.

8 Claims, 2 Drawing Sheets

PRECISION-TYPE SINGLE-SEED PNEUMATIC PLANTER

BACKGROUND OF THE INVENTION

The present invention relates to precision-type, single-seed drilling planters, which are adapted to deposit seeds one-by-one in the ground at regular intervals along sowing rows.

In the cultivation of maize, sugar beets, soya, horticultural-type vegetables and the like, single seed planters are well known for sowing or depositing either peeled or unpeeled, bare or coated seeds at a regular spacing. Precision-type single-seed planters have a number of advantages as compared with universal-type ones. These advantages include a reduction in or even the elimination of downtimes required to subsequently carry out a thinning out of the plants, a simplification in the tilling and harvesting operations, and a saving in the quantity of seeds used.

Precision-type single-seed planters can essentially be divided into two categories based on the distribution system that they implement, i.e. mechanical or pneumatic.

The present invention relates to precision-type single-seed planters falling into the pneumatic-type category, in which the withdrawal of the seeds from the loading container, their separation and their distribution one-by-one are performed by a rotating perforated disk having one or more concentric series of perforations. A suction blower acts on one side of the disk to create a vacuum through the perforations of the disk and thereby keep the seeds adhering to the disk until the seeds reach a discharge zone. A mechanical separator on the other side of the disk is provided to select, one by one, the seeds to be adhered to the disk by causing excess seeds to fall back into a seed container.

In single-seed planters of the known type, in which the perforations of the disk are generally circular, it is rather difficult to ensure that only a single seed adheres to the disk at each perforation of the disk, particularly in those cases in which the seeds have no regular shape and/or have differing sizes. It is therefore general practice to use disks with quite large perforations so as to ensure that at least one seed is in all cases captured for distribution. However, by increasing the size of the individual perforations so as to enable even the largest seeds in the lot to be held by sufficient suction in the perforations, a further problem is created in that smaller seeds then have the opportunity of passing through the perforations, or else in that many smaller seeds may get stuck in the perforations, thereby obstructing them. It is therefore quite difficult to succeed in separating the seeds in a manner in which only a single seed is actually held under suction at each perforation. Further, the seeds that become stuck in the perforations may ultimately be broken up by the separator when the latter interacts with the perforated disk.

It therefore ensues that precision-type single-seed planters have to be provided with several sets of perforated disks having perforations drilled to different diameters. The disks must therefore be changed quite often according to the average size and shape of the seeds to be planted, so as to reduce the extent of the above-described drawbacks.

Furthermore, the separators must be positioned and adjusted in such a way as to ensure that a single seed remains at each perforation. However, in the precision-type single-seed planters of the known type this is not possible when the seeds have irregular shapes, since any adjustment enabling two smaller seeds to be effectively separated will quite often prove inadequate in keeping a larger seed adhering to the disk, and so the larger seeds will often fall back into the seed container and create a void in the sowing sequence. In the opposite case, any adjustment of the selector that enables large or ill-positioned seeds to be kept adhering to the disk may enable several smaller seeds to pass through a perforation, thereby giving rise to an irregular seed deposition pattern.

Italian patent specification no. 1.145.917 filed by F. Walter & H. Wintersteiger KG describes a precision-type single-seed drilling machine of the pneumatic type, in which the seed drilling disk is formed by two parts, namely by a disk-type body member connected to the suction fan and a thin disk-like plate adhering against the surface of the body member and facing the supply of seeds. The disk-type body member is fixed and is provided with a guide slot extending from the center to the periphery of the body member so as to follow the ejection path of the seeds. The disk-like plate is rotatable and is provided with a plurality of radial slots extending from the central portion to the periphery of the disk. This particular type of construction enables a slower speed to be implemented at which the seeds are extracted from the container, and therefore facilitates a more effective capturing of the seeds by the disk. This occurs owing to the fact that the slots are arranged in a radial pattern and extend from the central portion of the disk. However, in order to enable the seeds to adhere at a small central portion of the disk, only a limited number of slots can be provided. It therefore ensues that, with the distribution of a small number of seeds for each rotation of the disk, it is necessary to work at a very slow forward-moving speed on the field, otherwise there would be no effective or even acceptable sowing action since the seeds would necessarily be subjected to an excessively high centrifugal force.

Although such a system operates quite effectively when used with seeds having a roundish shape, it is clearly less effective when it comes to individually distributing single seeds having irregular shapes, e.g. tapered or pointed, or having differing sizes. Furthermore, this system has a rather complicated structure as it practically requires a two part disk body, each of the parts having to be provided with a number of special slots.

It should further be stressed that the seeds contact both parts of the disk and are subjected to a rolling action which, on the one hand, may promote the separation of the seeds but, on the other side, will cause the seeds to become damaged owing to the considerable friction which arises between the seeds and the surfaces of both parts of the disk along a considerable length of travel of the seeds.

European patent application no. 0.338.883 filed by ATELIERS RIBOULEAU describes a precision-type single-seed drilling machine of the pneumatic type, in which the distribution disk is provided with circular, equally spaced perforations arranged in one or two circular patterns near the outer edge of the disk.

The main feature of this machine resides in the suction device which has an inner channel with a varying cross section branching off into two arms, one of which arms is provided with a shut-off member capable of isolating the channel from the suction device. In a particular embodiment, the distribution disk is provided with circular perforations arranged along two circular patterns, as well as a set of fins arranged in an alternate sequence with the perforations, which set the seeds in motion in the container and convey them from the release point in the suction device to the point at which they fall into the ground.

In this particular embodiment, as the seeds pass from one ring of perforations to the other there occurs a separation of the seeds which, within certain limits, is independent of the actual size and shape of the seeds. It is, however, quite apparent that the space taken up by the fins arranged in an alternate sequence with the perforations has a limiting effect on the quantity of perforations that can actually be provided in each circular pattern. Consequently, the number of seeds that can be distributed for each rotation of the disk is relatively small.

It therefore ensues that the forward moving speed of the drilling machine in the field is necessarily low so as to obviate any excessively high rotation speed of the disk, which would negatively affect the seeds owing to the centrifugal forces generated. It will be also appreciated that such an arrangement employs quite an expensive and complicated structure.

In another disclosed embodiment, which is adapted to operate in a likewise manner, the distribution disk is not provided with any fins, but is associated with a selector element provided with rectilinear slits. The position of the selector element is adjustable with respect to the perforations of the disk, so that the seeds held by suction in the perforations are caused to impinge the selector element and are in this way separated. However, even such a construction appears to have its drawbacks. As a matter of fact, the circular perforations in the distribution disk cannot be of such a large diameter as to prevent seeds from getting stuck in them or from passing unhindered through them. On the other hand, the perforations cannot have too small a diameter because the suction in the perforations would turn out to be inadequate to effect seed extraction from the hopper. Furthermore, the separator is not efficient when it comes to irregularly shaped seeds or seeds of differing sizes.

SUMMARY OF THE INVENTION

It is the main object of the present invention to provide an improved type of pneumatically operated, precision-type, single-seed planter which has a simpler structure than the currently known machines of the same type, and which ensures that the seeds are separated into single seeds in an effective manner regardless, within reasonable limits, of the size and the shape of the seeds.

To achieve the above object of the present invention, the disk of the planter has a series of elongate perforations of a narrow width, i.e. a width that is substantially less than the length thereof, extending through the disk adjacent the periphery thereof. The large size of the perforations in the lengthwise direction thereof allows an amount of suction to be produced in the perforations which is sufficient to hold even the largest seeds. On the other hand, even the smallest seeds cannot pass through the perforations because the smallest dimension of such seeds is still larger than the narrow width of the perforations.

To ensure that a plurality of such small seeds do not adhere to the disk at a single perforation, a selector element is provided at the side of the disk facing the interior of the seed container and located at the periphery of the disk. The selector element has an edge of such a profile that the area of each said perforation of the disk that is exposed to the interior of the seed container is reduced as the perforation travels past the selector element upon rotation of the disk, whereby the selector element can throttle suction effected in each perforation in such a manner as to allow only a single seed to be suctioned to the disk at each of said perforation which has been rotated past the selector element.

BRIEF DESCRIPTION OF THE DRAWINGS

The main features of the present invention along with other characteristics and advantages thereof will be further described below by way of non-limiting example, with reference to the accompanying drawings in which.

DETAILED DESCRIPTION OF THE PREFERRED EMBODIMENT

Figure 1:
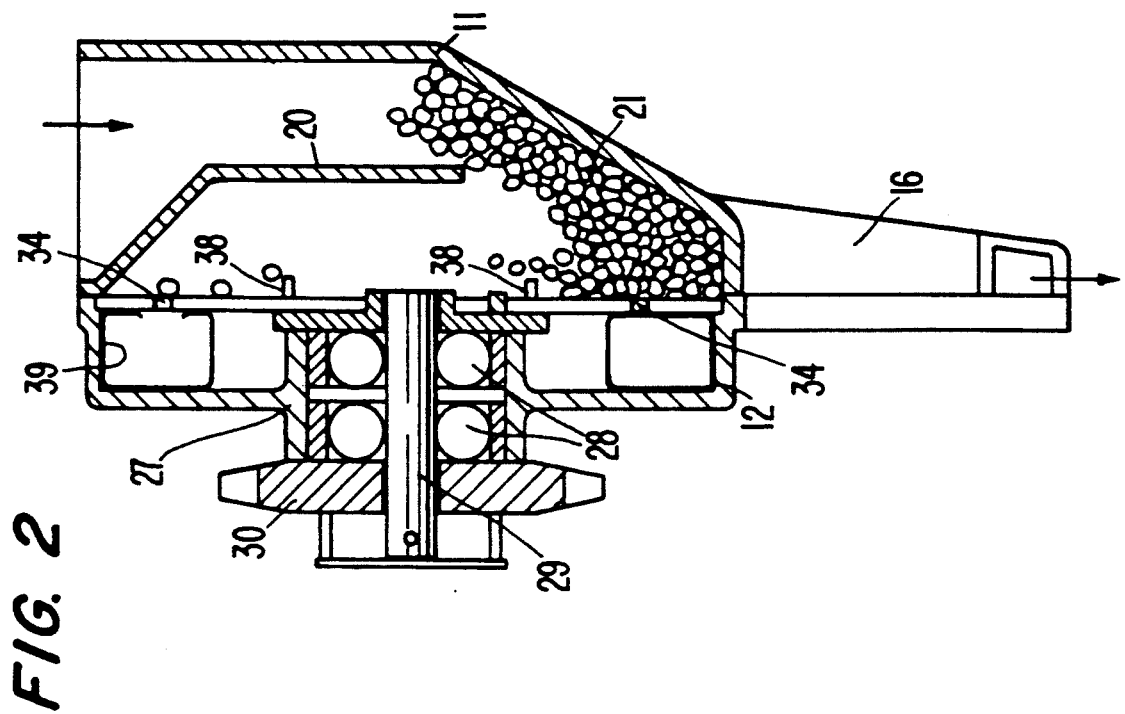
FIG. 1 is a perspective view, partly broken away, of the single-seed distributor according to the present invention.

The precision-type single-seed planter 10 essentially includes a seed container 11, a box-like suction housing 12 mounted to container 11, and a perforated disk 13 and selector element 14 arranged therebetween.

The seed container 11 is provided at its upper portion with an inlet in the form of a hopper 15 through which the seeds are loaded, and at its lower portion with an outlet in the form of an unloading conduit 16 through which the seeds are discharged from the outlet into the ground. Preferably, the seed container also includes a lid 17 that can be opened to clean the container 11, such as when it is required to change the type of seeds to be planted.

The seed container 11 is further provided with projections 18 and 19 that are adapted to cooperate with respective projections 181 and 191 of the suction housing 12 to effect the mounting (by means of holes, guide pins and bolts) of the container 11 to the casing 12.

Figure 2:
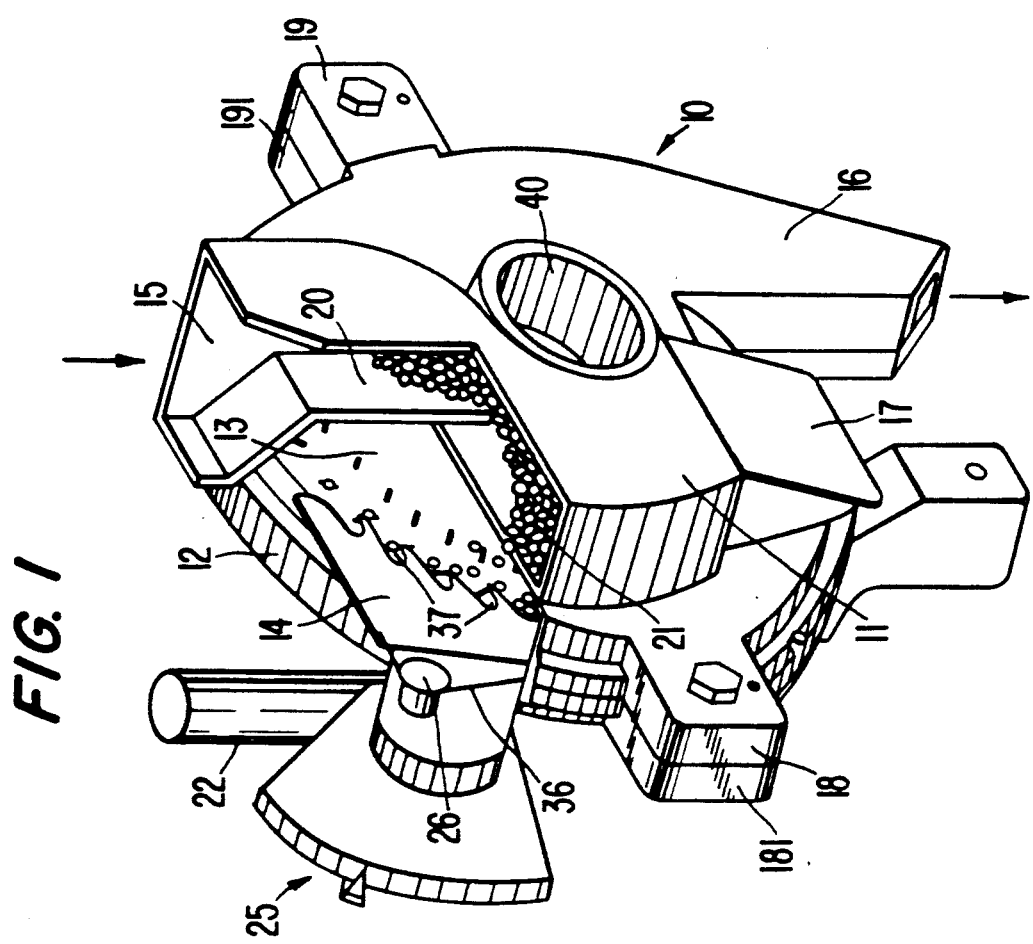
FIG. 2 is a cross-sectional view of the single-seed distributor taken along line II—II of FIG. 1.

In a preferred way, the hopper 15 extends downwards into the interior of the container 11 with a wall 20, which effectively feeds and conveys the seeds 21 into the container 11, as shown in FIG. 2.

The box-like suction housing 12 is connected with an air suction device (for instance, a motor-driven fan of known type, not shown in the Figure) through a suction conduit 22 which terminates at an opening 23 (FIG. 3) in the housing so that air can be evacuated from the interior of the housing through opening 23. An arcuate suction slot 24 is open to the interior of the housing 12 as well. The slot 24 confronts the disk 13 which, as mentioned above, is in effect interposed between the container 11 and the housing 12.

The housing 12 supports a manually-operatable regulator 25 provided with an indicator scale. A cam 26, or similar eccentric element, is rotatably supported on the housing 12 of the planter. The position of the selector element 14 can be adjusted by manipulating the regulator 25 to rotate cam 26 as will be described hereinafter.

Figure 3:
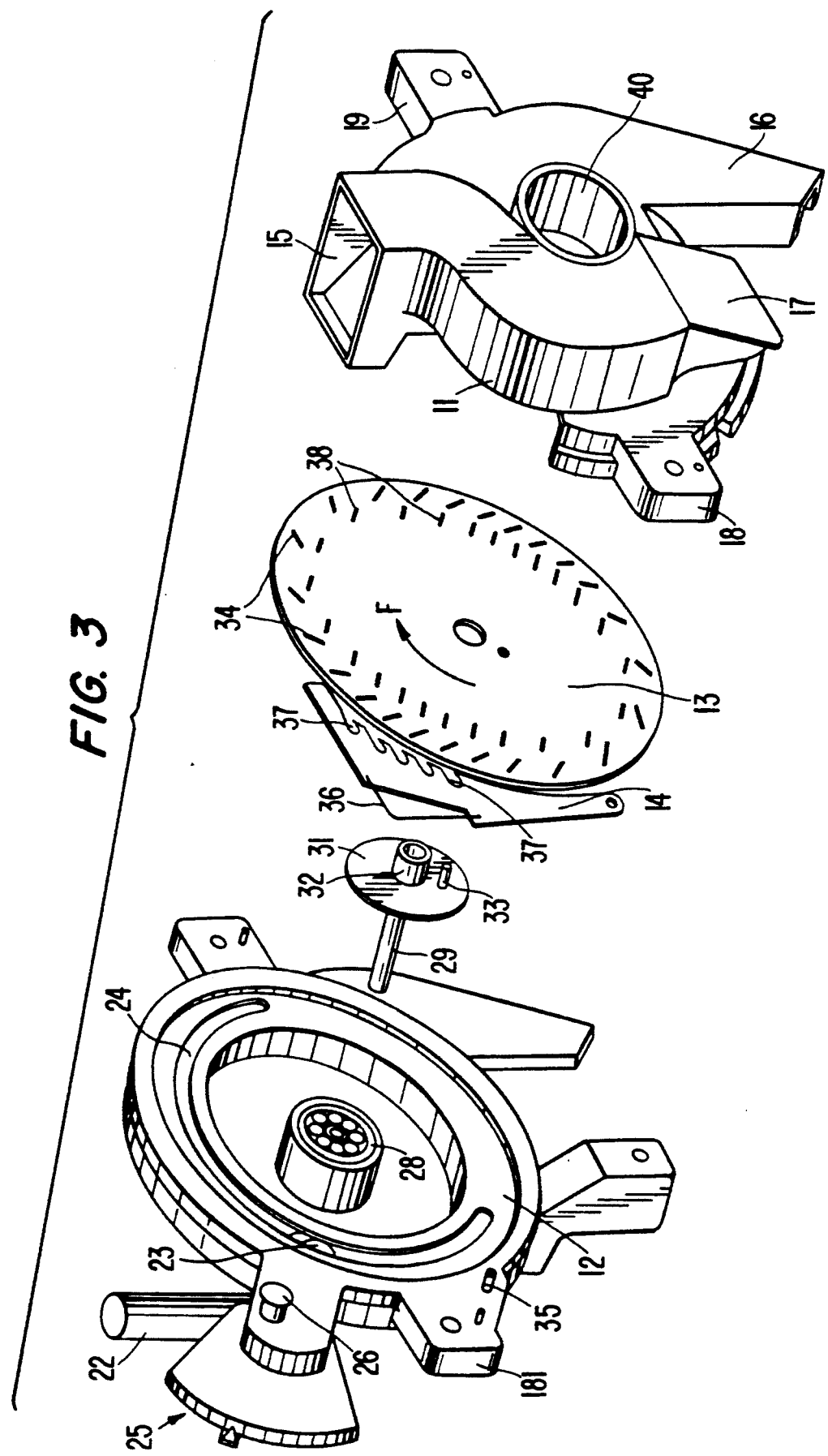
FIG. 3 is a perspective exploded view of the distributor of FIG. 1.

The housing 12 is also provided with a hub 27 (FIG. 2). A shaft 29 passes through the hub 27 as supported by bearings 28. The shaft 29 may be driven through a cogwheel 30 to rotatably drive the disk 13, to which it is connected by a driving disk 31, a Centering dowel 32 and a driving pin 33 (FIGS. 2 and 3). Specifically, the driving disk 31 is integral with the shaft 29 so as to undergo rotation therewith. The pin 33 is integral with and extends from the driving disk 31 at a location that is eccentric with respect to shaft 29. The pin 33 extends into a small hole in the disk 13 so as to be connected thereto, whereby rotation of the shaft 29 is transmitted into rotation of the disk 13.

According to the main feature of the present invention, the disk 13 is provided with a series of elongate perforations 34 of a narrow width, which are preferably spaced equally in a circle extending in the circumferential direction of the disk adjacent the outer periphery of the same disk. Because the perforations 34 have an elongate shape and a small cross section in the widthwise direction, small seeds are prevented from passing therethrough. On the other hand, sufficient air flows through the perforations 34 by suction to keep larger seeds adhered to the disk 13 at the perforations during the rotation of the disk 13. The perforations 34 may, in an advantageous manner, extend lengthwise in a direction which is inclined with respect to radial directions of the disk 13 passing therethrough, as shown in FIG. 3.

The selector element 14 is disposed at that side of the disk 13 which faces the interior of the seed container 11. As shown in FIG. 1, the selector element 14 is located at the periphery of the disk 13 so as to cooperate with the perforations 34. Basically, the edge of the selector element 14 has such a profile that the area of each perforation that is left exposed to the interior of the seed container 11 is reduced as that perforation 34 travels past the selector element 14 upon rotation of disk 13. According to a particular embodiment, the profile of the selector element 14 is designed such that the selector element covers part of each perforation passing thereby. Thus, seed suction and single-seed selection portions of the perforation are established by the selector element, the seed suction portion being located closer to the center of the disk 13 than the single-seed selection portion. This enhances the effectiveness of the selector element far as both the separation of small seeds, without them passing through the perforation, and the retention of larger seeds, which are exposed to a larger flow of suction air, are concerned.

If the point is to achieve a basically low-cost planter, which will only handle seeds of the same kind, the selector element 14 may be fixed in the planter. Even in this case, with the disk 13 provided with the elongate perforations 34 according to the invention, a significant improvement is achieved in the operation and the performance capabilities of the planter, i.e. a more reliable and accurate distribution of the single seeds is realized. In a preferred way, however, the selector element 14 is pivotably mounted in the planter about a pin 35 integral with the housing 12, and is retained in a position by being biased against the cam 26 by means of a forked spring 36.

By manipulating the regulator 25, the cam 26 is rotated. Consequently, the selector element 14 is moved into a suitable position over the surface of the disk 13, i.e. with respect to the perforations 34, according to the type of seeds that are to be distributed when planted.

The shifting and adjustment of the selector element may of course be facilitated by different mechanical elements, such as screws, levers or sliders, while in all cases achieving a similar result and effect.

According to a further feature of the present invention, the edge of the selector element 14 defines a number of slots 37 and a plurality of projections terminating at sharp points between the slots 37. Because the edge of the selector element 14 is situated in front of the series of perforations 34 in the disk 13, the slots 37 cooperate with the perforations 34.

The open ends of the slots 37 lie in a pattern which is inclined with respect to the direction of rotation of the disk 13. In addition, the slots 37 extend rather deeply into the selector element 14. Thus, the slots 37 ensure that single seeds become associated with each of the perforations of the disk 13 and that multiple or excess seeds fall back into the seed container 11.

The projections, where each one of the slots 37 terminates, have a sharp profile so as to form ridges that allow each selected seed to "leapfrog" thereover and into the respective slots 37 downstream thereof regardless, within certain reasonable limits, of the shape and the size of the seed. Moreover, the projections cause multiple or excess seeds to be released from the perforations and fall off of the disk 13.

It may be useful, although not strictly necessary, to provide the inner surface of the disk 13 with a series of lugs 38 or the like arranged in a circle at given intervals so as to promote an agitation of the seeds in the container 11 during the rotation of the disk 13.

In the operation of the planter, the container 11 is filled with seeds, the disk 13 is rotated (in the direction indicated by arrow F in FIG. 3) and the air suction device is started.

The seeds 21, owing to the suction of air through the conduit 22, the hole 23, the arcuate slot 24 and the perforations 34, are caused to adhere to the disk 13 and are lifted by the same disk, and are progressively separated, as they pass the slots 37 of the selector element 14.

Through an appropriate position of the selector element 14 it is possible to achieve that there will be only one seed adhering to the disk 13 in each perforation 34 by the time that perforation passes by the last slot 37 in the direction of rotation of the disk 13. The single seeds will then come off the same disk when it reaches the discharge zone at the unloading conduit 16, where the seed is no longer subject to suction because the suction slot 24 terminates just upstream of the discharge zone.

It will of course be appreciated that the above-described embodiment may be modified without departing from the true spirit of the present invention. For instance, the perforations may each have an elongate shape which is different from the shape shown in the figures, e.g. rhomboidal. Furthermore, a hollow sealing ring 39 or similar gasket of plastic material may be appropriately provided between the casing 12 and the disk 13 so as to ensure a correct positioning of the two elements and an effective seal therebetween (FIG. 2).

Furthermore, the seed container 11 may be provided with a central opening 40 (FIGS. 1 and 2) in which driving elements for the disk 13 are rotatingly supported, as opposed to the arrangement shown in FIG. 2 in which the suction housing 12 supports the driving elements.

Accordingly, all such variations and modifications are seen to be within the true scope of the present invention as defined by the appended claims.

What is claimed is:

1. A pneumatic precision-type single-seed planter comprising: a seed container including an inlet through which seeds can be loaded in the planter and an outlet through which the seeds are discharged; a suction housing mounted to said seed container, said suction housing having an opening therein through which air can be evacuated to create suction in the planter; a disk having two sides and rotatably supported in the planter, one side of said disk facing the interior of said suction housing and the other side of said disk facing the interior of said seed container, and said disk having a series of elongate perforations of a narrow width extending therethrough adjacent the outer periphery of the disk; and a selector element disposed at the side of the disk facing the interior of said seed container and located at the periphery of the disk, said selector element having an edge defining a plurality of slots and a plurality of projections terminating at sharp points between said slots, said slots and projections collectively forming a series of ridges directly behind which said elongate perforations pass as said disk is rotated such that the area of each said perforation of the disk that is exposed to the interior of said seed container is reduced by said ridges as the perforation travels past said selector element upon rotation of said disk, whereby said selector element can throttle suction effected in each said perforation via the interior of said suction housing in such a manner as to allow only a single seed to be held on said disk under suction at each said perforation which has been rotated past said selector element.

2. A pneumatic precision-type single-seed planter as claimed in claim 1, wherein each of the ridges of said selector element covers part of each said perforation passing thereby upon rotation of said disk so as to effectively separate the perforation into a seed suction portion and a single-seed selection portion exposed to the interior of said seed container, the seed suction portion being located closer to the center of said disk than said single-seed selection portion.

3. A pneumatic precision-type single-seed planter as claimed in claim 1, wherein said perforations are spaced at equal intervals from one another in a circle extending in the circumferential direction of said disk, and each of said elongate perforations extends lengthwise in a direction that is inclined with respect to a line extending radially of said disk and therethrough.

4. A pneumatic precision-type single-seed planter as claimed in claim 2, wherein said perforations are spaced at equal intervals from one another in a circle extending in the circumferential direction of said disk, and each of said elongate perforations extends lengthwise in a direction that is inclined with respect to a line extending radially of said disk and therethrough.

5. A pneumatic precision-type single-seed planter as claimed in claim 1, wherein said selector element is pivotably supported in the planter, and further comprising a cam element rotatably supported in the planter, a spring biasing said selector element into engagement with said cam element, and a manually operatable regulator operatively connected to said cam element so as to rotate the same whereby the position of the edge of said selector element relative to the periphery of said disk is adjustable by manipulating said regulator.

6. A pneumatic precision-type single-seed planter as claimed in claim 1, wherein said suction housing defines an arcuate slot open to the interior thereof and at a radial location where said series of perforations are provided so as to place respective ones of said perforations in communication with the interior of said housing while the respective perforations confront said arcuate slot during rotation of said disk, said arcuate slot terminating at a location spaced in the circumferential direction of said disk from said outlet of the seed container.

7. A pneumatic precision-type single-seed planter as claimed in claim 1, and further comprising a shaft rotatably supported in the planter and extending coaxially with said disk, a driving disk integral with said shaft so as to undergo rotation therewith, and a pin integral with and extending from said driving disk at a location thereon that is eccentric with respect to said shaft, said pin being connected to the perforated disk whereby rotation of said shaft is transmitted into rotation of the perforated disk by said pin.

8. A pneumatic precision-type single-seed planter as claimed in claim 1, and further comprising means for adjusting the position of said edge of the selector element relative to the periphery of said disk.

* * * * *